(12) United States Patent
Matsumura et al.

(10) Patent No.: US 7,624,594 B2
(45) Date of Patent: Dec. 1, 2009

(54) MAGNETIC RECORDING MEDIUM SUBSTRATE AND MANUFACTURING METHOD THEREFOR, MAGNETIC RECORDING MEDIUM, AND MAGNETIC RECORDING AND REPRODUCING DEVICE

(75) Inventors: Yukihisa Matsumura, Ichihara (JP); Katsuaki Aida, Chiba-ken (JP)

(73) Assignee: Showa Denko K.K., Tokyo (JP)

( * ) Notice: Subject to any disclaimer, the term of this patent is extended or adjusted under 35 U.S.C. 154(b) by 306 days.

(21) Appl. No.: 11/628,109

(22) PCT Filed: Jun. 20, 2005

(86) PCT No.: PCT/JP2005/011681
§ 371 (c)(1),
(2), (4) Date: Dec. 1, 2006

(87) PCT Pub. No.: WO2006/001400
PCT Pub. Date: Jan. 5, 2006

(65) Prior Publication Data
US 2007/0224460 A1      Sep. 27, 2007

Related U.S. Application Data

(60) Provisional application No. 60/585,603, filed on Jul. 7, 2004.

(30) Foreign Application Priority Data

Jun. 25, 2004  (JP) ............................. 2004-188104

(51) Int. Cl.
*C03B 5/24* (2006.01)
*C03C 11/00* (2006.01)
*G11B 5/00* (2006.01)

(52) U.S. Cl. ............... 65/30.13; 428/846.9; 428/848.6; 501/123

(58) Field of Classification Search .............. 428/846.8, 428/848.8, 846.9, 847, 64.3; 427/567; 501/76, 501/96.1, 123, 61, 32, 11; 313/143; 65/376, 65/30.14, 30.13; 451/63, 44, 43, 41
See application file for complete search history.

(56) References Cited

U.S. PATENT DOCUMENTS 6,554,615 B1 *  4/2003 Brodkin et al. ............... 65/376
2001/0014573 A1  8/2001 Shimoi et al.

(Continued)

FOREIGN PATENT DOCUMENTS

JP           11-191212 A        7/1999

(Continued)

OTHER PUBLICATIONS

Translation JA 11-191212.*
Translation JA 2001-180969.*

*Primary Examiner*—D. Lawrence Tarazano
*Assistant Examiner*—Louis Falasco
(74) *Attorney, Agent, or Firm*—Sughrue Mion, PLLC

(57) ABSTRACT

The present invention is a magnetic recording medium substrate made of amorphous glass of $B_2O_3$—$Al_2O_3$—$SiO_2$—$Li_2O$ type, wherein a chamfer is formed between an edge face at an outer circumference side or an inner circumference side of the substrate and a principal plane of the substrate, and a content of sodium and potassium at a surface area of the inner or outer circumference side edge face and a surface area of the chamfer is greater than a mean content of sodium and potassium of the magnetic recording medium substrate. With the present invention, it is possible to prevent generation of projections on a magnetic film, a protective film or the like due to movement of lithium ions in a magnetic recording medium substrate made of amorphous glass which includes lithium.

4 Claims, 1 Drawing Sheet

U.S. PATENT DOCUMENTS

| | | |
|---|---|---|
| 2001/0051585 A1* | 12/2001 | Ryu et al. .................... 501/76 |
| 2002/0041138 A1* | 4/2002 | Nishikawa ................. 313/143 |
| 2002/0055017 A1* | 5/2002 | Fukushima et al. ...... 428/848.8 |
| 2002/0169063 A1* | 11/2002 | Terashi et al. ................. 501/32 |
| 2002/0197437 A1* | 12/2002 | Hashimoto et al. ......... 428/64.3 |
| 2003/0164005 A1 | 9/2003 | Saito et al. |
| 2003/0172677 A1* | 9/2003 | Miyamoto et al. ......... 65/30.14 |
| 2004/0232576 A1* | 11/2004 | Brodkin et al. ............. 501/61 |

FOREIGN PATENT DOCUMENTS

| | | |
|---|---|---|
| JP | 2000-076652 A | 3/2000 |
| JP | 2001-023155 A | 1/2001 |
| JP | 2001-056929 A | 2/2001 |
| JP | 2001-180969 A | 7/2001 |
| JP | 2002-362944 A | 12/2002 |
| JP | 2003-277102 A | 10/2003 |

* cited by examiner

MAGNETIC RECORDING MEDIUM SUBSTRATE AND MANUFACTURING METHOD THEREFOR, MAGNETIC RECORDING MEDIUM, AND MAGNETIC RECORDING AND REPRODUCING DEVICE

TECHNICAL FIELD

The present invention relates to a magnetic recording medium substrate to be used in a hard disk device or the like and a manufacturing method therefor, a magnetic recording medium, and a magnetic recording and reproducing device using the same.

Priority is claimed on Japanese Patent Application No. 2004-188104, filed Jun. 25, 2004, the content of which is incorporated herein by reference. And, priority is claimed on U.S. provisional application No. 60/585,603, filed Jul. 7, 2004, the content of which is incorporated herein by reference.

BACKGROUND ART

In recent years, the recording density of hard disk devices (magnetic recording and reproducing devices or HDDs), which are a type of magnetic recording and reproducing device, has been significantly improved and the current recording density of mass-produced hard disk devices reaches 80 Gbpsi (gigabits per square inch). A magnetic head in such a magnetic recording and reproducing device is designed to fly at a constant flying height while the magnetic recording medium is being rotated. That is, during a read/write operation, the magnetic head flies above the magnetic recording medium at a constant flying height to prevent direct contact between the magnetic head and the magnetic recording medium, so that the reliability of the magnetic recording and reproducing apparatus is enhanced.

Recently, the flying height has lowered in accordance with a rise in recording density and fallen to the point of 10 nm at present.

In order to decrease the head flying height, the smoothness (lack of projections) of the surface of the magnetic recording medium is important. Especially, there is known a thermal asperity phenomenon in which a MR head or a GMR head is unable to read a signal due to an instantaneous temperature rise caused by contact with a projection of the surface of the magnetic recording medium present due to the characteristics thereof, and smoothness of the surface of the magnetic recording medium is especially valued as a measure against thermal asperity.

In order to realize such a smooth surface of a magnetic recording medium, a magnetic recording medium substrate for a magnetic recording medium of recent years is made of a glass substrate using chemically tempered glass, crystallized glass or the like instead of aluminum alloy. Since aluminum alloy undergoes plastic deformation due to the material characteristics thereof in the course of mechanical treatment such as a polishing process, it is difficult to obtain the smoothness mentioned above when using aluminum alloy.

In contrast, a glass substrate, which has high hardness of surface and does not undergo plastic deformation even when treatment such as a polishing process is performed, has the advantage that it makes it easy to obtain a smooth surface. For these reasons, hard disks having magnetic recording medium substrates made of glass are being increasingly used as hard disks having high recording density.

A magnetic recording medium substrate made of glass, however, has the following problems.

Regarding glass to be used for the magnetic recording medium substrate, tempered glass includes sodium and crystallized glass includes lithium as a main alkali metal. Such a metal ion, which has a small ionic radius, is easy to move, and is especially easy to move at high temperature and high humidity. Although the mechanism thereof has not been elucidated, sodium ions or lithium ions which move to the surface of a magnetic recording medium react with surrounding substances to form a variety of compounds such as hydroxides and carbonates and form projections on the surface of the magnetic recording medium, bringing the possibility of head crash due to a collision with a head which is flying. Moreover, the possibility of error occurrence during a read/write operation or of head crash as a consequence of deterioration of the characteristics of a magnetic film caused by corrosion of the magnetic film has been pointed out. Furthermore, the possibility of corrosion of a magnetic head element itself or of head crash due to adhesion of these alkali metal ions to the head side has also been pointed out (see Japanese Unexamined Patent Application First Publication No. 2001-23155, for example).

DISCLOSURE OF INVENTION

An object of the present invention is to prevent generation of projections on a magnetic film, a protective film or the like due to movement of lithium ions in a magnetic recording medium substrate made of amorphous glass which includes lithium.

In order to resolve the above problem, the present inventors have carried out a dedicated study and arrived at the present invention as a result.

That is, the present invention provides the following aspects.

(1) A magnetic recording medium substrate made of amorphous glass including lithium, wherein the substrate is made of amorphous glass of $B_2O_3$—$Al_2O_3$—$SiO_2$—$Li_2O$ type, a chamfer is formed between an edge face at an outer circumference side or an inner circumference side of the substrate and a principal plane of the substrate, and a content of sodium and potassium at a surface area of the inner or outer circumference side edge face and a surface area of the chamfer is greater than a mean content of sodium and potassium of the magnetic recording medium substrate.

(2) The magnetic recording medium substrate described in (1), wherein a mean content of sodium oxide and potassium oxide of the magnetic recording medium substrate is 3.0-7.0% by mass in total.

(3) A manufacturing method of a magnetic recording medium substrate, comprising a step of performing surface treatment by dipping an amorphous glass substrate of $B_2O_3$—$Al_2O_3$—$SiO_2$—$Li_2O$ type in fused salt including sodium or potassium.

(4) The manufacturing method of a magnetic recording medium substrate described in (3), wherein the fused salt including sodium or potassium is sodium nitrate or potassium nitrate.

(5) The manufacturing method of a magnetic recording medium substrate described in (3) or (4), wherein a temperature for performing the surface treatment is 300-450° C.

(6) A magnetic recording medium substrate which is manufactured by a manufacturing method of a magnetic recording medium substrate of the present invention described in the above (3) to (5).

(7) A magnetic recording medium in which a magnetic recording medium substrate of the present invention described in the above (1), (2) or (6) is used and at least a magnetic layer is formed on the surface thereof.

(8) A magnetic recording and reproducing device characterized by comprising a magnetic recording medium described in the above (7) and a magnetic head for recording and reproducing information on the magnetic recording medium.

With the present invention, it is possible to enhance the reliability of a magnetic recording medium, which is made by forming a magnetic film or the like on a magnetic recording medium substrate by a sputtering technique or a CVD technique, at high temperature and high humidity, and a highly reliable magnetic recording medium can be provided. With a magnetic recording and reproducing device using the magnetic recording medium, stabilization of performance can be expected.

BEST MODE FOR CARRYING OUT THE INVENTION

Figure 1:
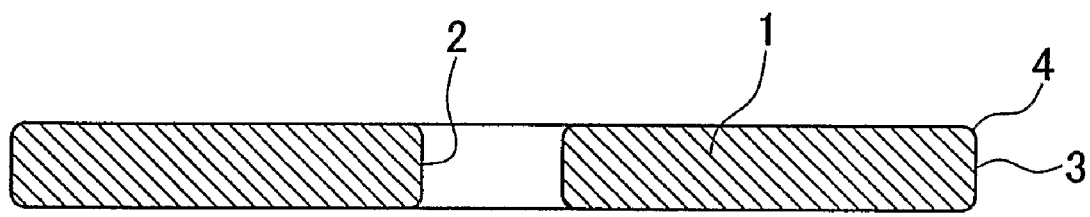
FIG. 1 is a view schematically showing a sectional view of a magnetic recording medium substrate of the Example. The reference numerals shown in FIG. 1 are defined as follows: 1, Magnetic Recording Medium Substrate; 2, Inner Circumference Face; 3, Outer Circumference Face; 4, Chamfer.

The present invention provides a magnetic recording medium substrate made of amorphous glass which includes lithium, characterized in that a chamfer is formed between an edge face at an inner or outer circumference side of the substrate and a principal plane of the substrate, and a content of sodium at a surface area of the inner or outer circumference side edge face and a surface area of the chamfer is greater than a mean value of the content of sodium on the magnetic recording medium substrate.

Glass for a substrate to be used in the present invention is amorphous glass which includes lithium. Amorphous glass including lithium is, for example, amorphous glass of $Al_2O_3$—$SiO_2$—$Li_2O$ type or of $B_2O_3$—$Al_2O_3$—$SiO_2$—$Li_2O$ type and, especially, is preferably amorphous glass of $B_2O_3$—$Al_2O_3$—$SiO_2$—$Li_2O$ type. Amorphous glass of $B_2O_3$—$Al_2O_3$—$SiO_2$—$Li_2O$ type includes $B_2O_3$, $Al_2O_3$ and $SiO_2$ as skeleton ingredients of 80-95% by mass in total and includes $Li_2O$ as an alkali ingredient of approximately 5-7% by mass. The amount of lithium included in the substrate glass in the present invention includes the amount of lithium which is added into the substrate intentionally and the amount of impurity which is included inevitably. $Na_2O$ of approximately 5% by mass and $K_2O$ of approximately 2% by mass are included as alkali ingredients as well as $Li_2O$, so that included (Na+K) becomes approximately 4% by mass in total.

Although crystallized glass of $Al_2O_3$—$SiO_2$—$Li_2O$ type or of $B_2O_3$—$Al_2O_3$—$SiO_2$—$Li_2O$ type is widely used for glass substrates for magnetic recording mediums, the present invention employs amorphous glass.

This is based on the fact that it was found that a significant corrosion reducing effect was obtained with amorphous glass while a similar effect was not obtained with crystallized glass when preparing amorphous glass and crystallized glass and performing ion exchange treatment simultaneously to compare the ion exchange depth, the lithium ion elution amount and corrosion on the magnetic film. This seems to result from the fact that effective ion exchange between lithium and sodium could not be performed in crystallized glass and, therefore, the elution amount of lithium could not be reduced.

In analysis of projections which seems to result from the movement of the lithium ions mentioned above, the present inventors found that many projections exist at the inner/outer circumference portion of a magnetic recording medium and in particular many projections exist at a chamfer of the inner/outer circumference portion. On the other hand, only a small number of projections which seem to result from the movement of the lithium ions were observed at an area other than the chamfer of the magnetic recording medium substrate.

This seems to result from the specificity of the form of the inner/outer circumference side edge face of the magnetic recording medium substrate. That is, an outer circumference side edge face and an inner circumference side edge face of a magnetic recording medium substrate undergo a chamfering process and then a polishing process using slurry such as ceric oxide to make a mirror surface. Many chips, pits and the like are observed at the edge faces after the chamfering process, and it is considered that these defects cause movement of the lithium ions in the magnetic recording medium and cause generation of projections, though the mechanism has not been elucidated.

The present inventors tried to reduce the movement amount of the lithium ions by performing a polishing process after the chamfering process to make a mirror surface and decreasing defects at the edge faces, but still could not prevent generation of projections sufficiently. It is considered that a low thickness due to difficulty in attachment of a magnetic film or a protective film to the chamfer and to the edge faces at the inner circumference side and the outer circumference side by sputtering or the like in comparison with the principal plane is one of the reasons therefor.

Therefore, the present inventors tried to perform inner/outer diameter processing, a chamfering process of edge faces at the inner circumference side and the outer circumference side and a polishing process, and then perform ion exchange between the lithium ions and sodium or potassium ions by dipping the substrate glass in fused salt including sodium or potassium and performing surface treatment to remove lithium from the surface portion of the magnetic recording medium substrate glass.

The generation of projections which seems to result from the movement of lithium ions can be suppressed effectively as long as exchange between the lithium ions and sodium ions or potassium ions is performed at least at the chamfer and at the inner circumference side edge face and the outer circumference side edge face. For example, in a case where exchange between the lithium ions and sodium ions or potassium ions is performed after inner and outer diameter processing, the effect can be obtained as long as the depth of an area in which ion exchange was performed is at least greater than or equal to the removal amount in a chamfering process of the inner circumference side edge face and the outer circumference side edge face and in a polishing process of the inner circumference side edge face and the outer circumference side edge face, even when the depth of the area in which ion exchange was performed is not greater than nor equal to the removal amount in a rough lapping process, a precision lapping process, a polishing process or the like of the principal plane.

Consequently, the surface treatment operation can be performed by performing a chamfering process of edge faces at the inner circumference side and the outer circumference side, performing a polishing process, and then dipping the substrate glass in fused salt including sodium or potassium and holding the substrate glass for a predetermined time period. It is most effective to perform the surface treatment operation immediately before the last polishing process, with the object of keeping a large thickness of a high in which the lithium ions are exchanged with the sodium ions or potassium ions. This is because polishing of edge faces after surface treatment may cause removal of the surface treatment portion at the outer circumference side, since the polishing amount of the outer circumference edge face is required to be approximately 25 μm on one side.

Fused salt which can be used is, for example, sodium nitrate ($NaNO_3$, melting point: 308° C.) having a relatively low melting point. Moreover, salt including potassium which can be used is, for example, potassium nitrate ($KNO_3$, melting point: 387° C.).

A glass substrate in which the lithium ions at the chamfer of edge faces at the inner circumference side and the outer circumference side has been exchanged with sodium ions or potassium ions by ion exchange can be obtained by dipping a substrate glass in the fused salt mentioned above and holding the same at a temperature of 300-450° C. for 10-60 minutes. In this case, the exchange rate and the exchange depth with the lithium ions become greater as the processing temperature is high and as the processing time is long. Although the depth of ion exchange begins to be saturated at approximately 10 μm from the surface, a 10 μm-depth of surface treatment is sufficient.

A substrate for a magnetic recording medium is made by further performing polish finishing for this glass substrate.

With a glass substrate which has undergone surface treatment as described above, the lithium ions at a chamfer of edge faces at the inner circumference side and the outer circumference side are exchanged with sodium ions or potassium ions, the lithium concentration becomes lower than the mean value of the glass substrate and the total amount of the sodium ions and potassium ions becomes greater than the mean value of the glass substrate. When substrate glass which has not undergone surface treatment and substrate glass which has undergone surface treatment are dipped in 50 ml of pure water at 80° C. for 24 hours and the elution amount of each of Li ions, Na ions and K ions is checked by ion chromatography, the elution amount of each of Li ions, Na ions and K ions of the former is respectively 127 ppb, 17 ppb and 0 ppb while the elution amount of each of Li ions, Na ions and K ions of the latter is respectively 21 ppb, 100 ppb and 13 ppb, showing that the Li concentration is decreased and the Na concentration and the K concentration are increased at the surface of the glass substrate.

In addition to this, the behavior of each of Li ions, Na ions and K ions at the surface of the glass substrate can be determined by measuring a profile in the depth direction of each of Li, Na and K using the SIMS.

Example

A magnetic recording medium substrate was made using amorphous glass which includes ($B_2O_3+Al_2O_3+SiO_2$) of 90% by mass and $Li_2O$ of 7% by mass as skeleton ingredients and the rest of which has a composition including $Na_2O$ and $K_2O$.

First, material glass having the above composition was melted and press molding was performed to obtain plate glass. An inner diameter bore was formed in the plate glass using a drill. Then, a two-stage lapping process of a rough lapping process and a precision lapping process was performed for the principal plane of the substrate to adjust the thickness of the substrate. Then, a chamfering process was performed respectively for an inner circumference side edge face which faces the inner diameter bore of the substrate material and an edge face at the outer circumference side to form a chamfer. FIG. 1 schematically shows a sectional view of the magnetic recording medium substrate 1. In the FIGURE, denoted at 2 is the inner circumference face, denoted at 3 is the outer circumference face and denoted at 4 is the chamfer.

Then, after polishing of the substrate glass which had undergone the chamfering process, the substrate glass was dipped in a molten sodium nitrate bath and held for thirty minutes to perform surface treatment to cause ion exchange. As a result of the surface treatment, the lithium ion ingredient at an inner circumference side edge face which faces the inner diameter bore and a chamfered portion at the outer circumference side was decreased in amount at the depth of 10 μm while sodium ions was increased in amount instead.

Moreover, at the principal plane which did not undergo a chamfering process, the lithium ion ingredient did not change and sodium ions and potassium ions did not increase in amount.

After the inner circumference side edge face and the outer circumference side edge face of the glass substrate treated as mentioned above were polished to make a mirror surface, the principal plane of the substrate material further underwent a final polishing process to make a mirror surface in order to obtain a magnetic recording medium substrate.

When the center line average surface roughness of the principal plane of the substrate was measured before loading the magnetic recording medium substrate into a sputtering device, the result was 4 angstroms.

This magnetic recording medium substrate was loaded into a sputtering device, a primary film composed of Cr alloy and a magnetic film composed of Co alloy were formed by sputtering, a diamond-like carbon film was formed thereon by a CVD method and Fonblin Z-Tetraol (made by Solvay Solexis Corporation) was further applied thereon as lubricant to make a magnetic recording medium. The total thickness of films formed by sputtering was 90 nm and the thickness of the film formed by CVD was 10 nm.

25 magnetic recording mediums were made. When each magnetic recording medium was left to stand in a thermohygrostat having a temperature of 85° C. and a humidity of 90% for 240 hours and then existence of projections which might be generated at the surface of the magnetic recording medium was checked by eyesight under a halogen lamp, no projections were observed at the edge face at the inner/outer circumference and at the chamfer.

A magnetic recording and reproducing device was manufactured using this magnetic recording medium. The manufactured magnetic recording and reproducing device was constructed to comprise a magnetic recording medium, a medium driving unit to rotate and drive the magnetic recording medium, a magnetic head for recording and reproducing information on the magnetic recording medium, a head driving unit and a recording and reproducing signal processing system, and the recording and reproducing processing system was constructed to process inputted data and send a recording signal to the magnetic head, and to process a reproducing signal from the magnetic head and process data.

Comparison Example

A magnetic recording medium substrate was made using crystallized glass having a composition including $SiO_2$: 75% by mass, $Al_2O_3$: 15% by mass and $Li_2O$: 10% by mass. Although chamfering of the same size as that of the Example and polishing were performed for this magnetic recording medium substrate in the same method as in the Example, the surface treatment was not performed at all.

As a result, the lithium ion ingredient at the inner circumference side edge face which faces the inner diameter bore of the obtained substrate glass and at a chamfered portion at the outer circumference side was equal to the mean value of the substrate glass. Sputtering and CVD deposition were performed for this magnetic recording medium substrate under the same conditions as those of the Example to manufacture a magnetic recording medium and projections which might be generated at the surface were checked for the same method as the Example. As a result, projections were observed at edge faces of the inner/outer circumference and it was found in composition analysis of the projections that the projections were composed of a lithium compound.

The invention claimed is:

1. A manufacturing method of a magnetic recording medium substrate, comprising the successive steps of:
    performing inner/outer diameter processing to form an inner diameter bore in the magnetic recording medium substrate composed of an amorphous glass substrate of $B_2O_3$—$Al_2O_3$—$SiO_2$—$Li_2O$ type;
    performing chamfering process to form a chamfer between inner/outer circumference side edge face and a principal plane of the magnetic recording medium substrate;
    polishing the inner/outer circumference side edge face and the chamfer;
    dipping the magnetic recording medium substrate in fused salt including sodium or potassium; and
    polishing the principle plane of the magnetic recording substrate, wherein
    the content of sodium and potassium at the surface area of the inner/outer circumference side edge face and the surface area of the chamfer is greater than a mean content of sodium and potassium of the magnetic recording medium substrate.

2. The manufacturing method of a magnetic recording medium substrate according to claim 1, wherein the fused salt including sodium or potassium is sodium nitrate or potassium nitrate.

3. The manufacturing method of a magnetic recording medium substrate according to claim 1, wherein a temperature for performing the dipping is 300-450° C.

4. The manufacturing method of a magnetic recording medium substrate according to claim 1, wherein
    the mean content of sodium oxide and potassium oxide of the magnetic recording medium substrate is 3-7% by mass in total.

* * * * *